Jan. 9, 1940.  U. R. BECK  2,186,318
LAZY BACK
Filed June 24, 1938  2 Sheets-Sheet 1
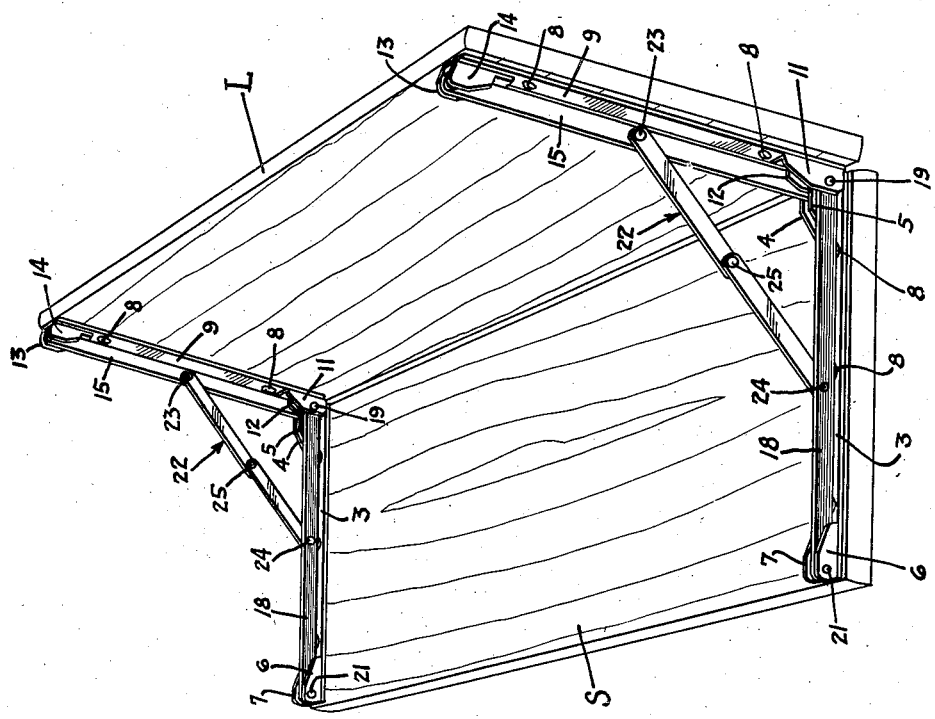
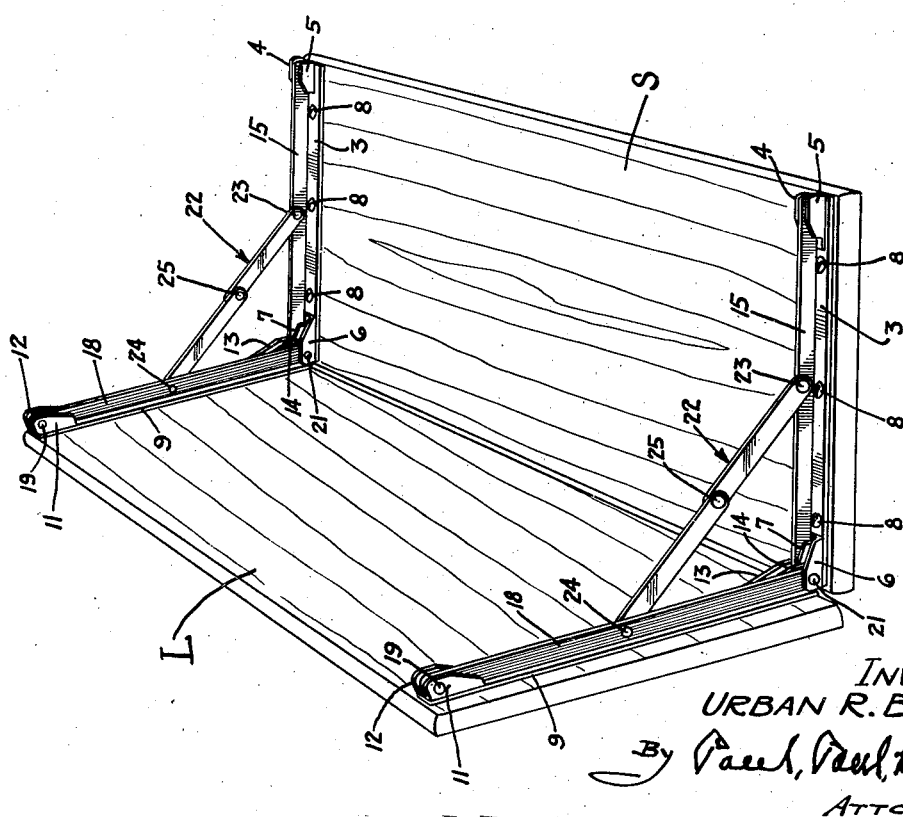
INVENTOR
URBAN R. BECK
By
ATTORNEYS Jan. 9, 1940. U. R. BECK 2,186,318
LAZY BACK
Filed June 24, 1938 2 Sheets-Sheet 2
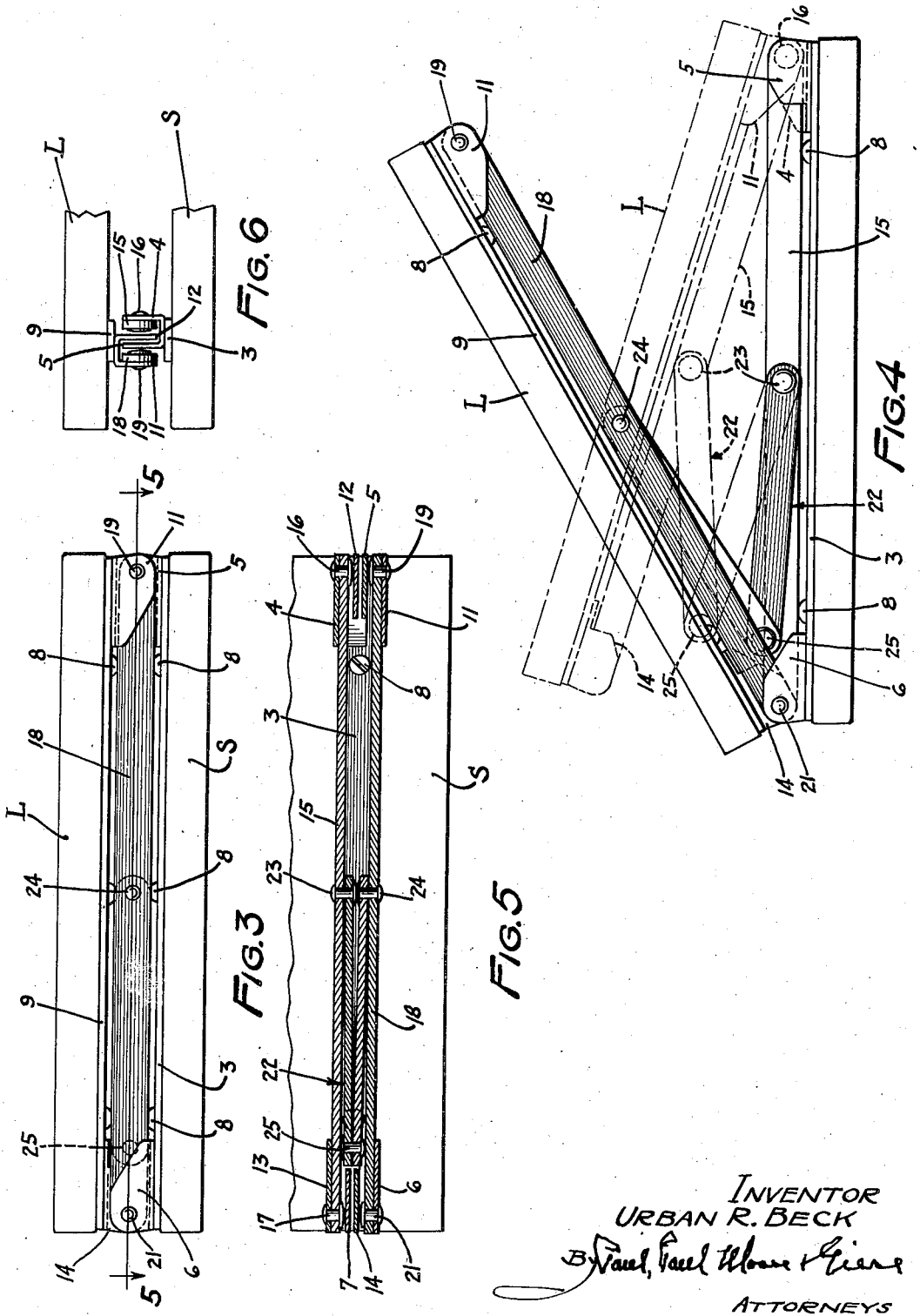
INVENTOR
URBAN R. BECK
ATTORNEYS Patented Jan. 9, 1940

2,186,318

UNITED STATES PATENT OFFICE 2,186,318

LAZY BACK

Urban R. Beck, Minneapolis, Minn.

Application June 24, 1938, Serial No. 215,603

9 Claims. (Cl. 16—138)

This invention relates to new and useful improvements in lazy backs and more particularly to such backs of the hinged type.

An object of the present invention is to provide a suitable support for a lazy back whereby the latter may be reversed with respect to the seat, so that the lazy back may function equally well, regardless of the direction in which the occupant of the seat may be facing.

A further object is to provide a novel hinge for pivotally connecting a lazy back to its seat, whereby the lazy back may be folded into flatwise relation with respect to the seat, when not in use, and whereby the lazy back may be selectively positioned at either side of the seat, so that the occupant of the seat may face in either direction.

A further object is to provide a reversible hinge structure adapted to pivotally support a hinged member in such a manner that the member is capable of swinging about opposed edges thereof, and also whereby it may be folded into flatwise relation with its supporting means.

Other objects of the invention reside in the simple and inexpensive construction of the apparatus which comprises few parts which are so interconnected that the hinged member may be operated in either direction; in the provision of such a device comprising a pair of links, each having one end pivotally connected to a fixed member and having their opposite ends connected to a member mounted for pivotal movement, and a brace having its ends pivotally connected to the intermediate portions of said links, thereby to limit swinging movement of one of said links with respect to the other, when the device is moved into operative position; in a hinged structure comprising a pair of similar links normally disposed in spaced parallel relation, when the apparatus is collapsed, and each of said links having one end connected to a common fixed support, and having their opposite ends connected to a member mounted for pivotal movement, the axes of said pivots being so disposed that the pivoted member may be swung upwardly into operative position from either side or end of the fixed support; in the provision of such a device which is extremely simple and inexpensive, whereby it may be manufactured in quantity production at small cost; and, in the provision of a reversible hinge which may readily be used for pivotally supporting various types of hinged members such, for example, as a lazy back, a door, and various other devices which are mounted for swinging movement and wherein it is desirable that the swinging movement of said member may be reversed.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 1 is a view showing the invention applied to a seat such as may be used in a conventional boat;

Figure 2 is a similar view but showing the lazy back reversed from the position shown in Figure 1;

Figure 3 is a view showing the lazy back collapsed, or folded into flatwise relation with respect to the seat;

Figure 4 is a view showing in full and dotted lines, the lazy back partially unfolded;

Figure 5 is a sectional plan view on the line 5—5 of Figure 3; and

Figure 6 is a detail view showing how the links and associated parts are folded into nested relation.

In the selected embodiment of the invention here shown, there is illustrated in Figures 1 and 2, a suitable panel S which may represent the seat of a boat, and which preferably is fixedly mounted upon suitable supports, such as the side walls of the boat, not shown.

The seats ordinarily provided in a row boat, usually comprise a single panel or board supported at its ends. These seats, as a rule, are not provided with lazy backs, because when the boats are used for fishing, conventional lazy backs are usually in the way and interfere with the movements of the fisherman.

A feature of the present invention is to provide a lazy back which may readily be used in connection with the seats of a conventional row boat, and which is so constructed that it may be folded into flatwise relation with the seat in closely spaced relation thereto, whereby when the lazy back is in inoperative position, as in Figure 3, it will provide the surface of the seat and thus does not interfere with the movements of the fisherman or occupants of the boat.

The novel hinge herein disclosed is clearly illustrated in Figures 1 and 2, and comprises an elongated rail 3 shown secured to one end of the seat portion S. One such rail is secured to each end of the seat S, as shown. These rails are provided at one end with spaced lugs 4 and 5 and at their opposite ends with similarly spaced lugs 6 and 7. The rails are secured to the seat S by suitable securing elements, such as screws or bolts 8. Similar rails 9 are secured to the lazy back L, and like the rails 3, are provided at one end with suitable spaced lugs 11 and 12 and at their opposite ends with similar lugs 13 and 14. As the two hinges are alike in construction, but one will be described in detail.

To pivotally connect the lazy back L to the seat portion S, each hinge has one end of a link 15 pivotally connected to the lug 4 by a pivot 16, and a pivot 17 connects the opposite end of the link 15 to the lug 13 of the rail 9 of the lazy back L. A similar link 18 has one end pivotally connected to the lug 11 of the rail 9 by a suitable pivot 19, and its opposite end to the lug 6 of the rail 3 of the seat portion S by a suitable pivot 21.

When the lazy back L is folded into flatwise relation with respect to the seat S, as shown in Figure 3, the pivots 16 and 19 at one end of the hinge or at one side of the seat, will be axially alined, and in like manner, the pivots 17 and 21 at the opposite end of the hinge will be axially alined, as clearly illustrated in Figure 5.

The lugs 5, 7, 12, and 14, serve as guides, and cooperate to prevent lateral movement of the parts of the hinge, as will readily be understood by reference to Figures 5 and 6. To retain the lazy back L in operative position, as shown in Figures 1 and 2, a suitable brace, generally indicated by the numeral 22, has its ends pivotally connected to the intermediate portions of the links 15 and 18, respectively, by suitable pivots 23 and 24. The brace 22 is shown comprising two parts, pivotally connected together as shown at 25, whereby said brace may be folded as clearly illustrated in Figures 3, 4, and 5, when the lazy back is folded into parallel relation with respect to the seat.

The links 15 and 18, in addition to retaining the lazy back L in operative relation with respect to the seat S, also prevent upward movement of the lazy back relatively to the seat, when the lazy back is in an operative position, as shown in Figures 1 and 2.

The novel hinge, herein disclosed, is very simple and inexpensive in construction. As will be noted, by reference to the drawings, the rails 3 and 9 are identical in construction and in like manner, the links 15 and 18 are alike, whereby the device may be made in quantity production at low cost. The braces 22 are also alike in construction, and have their ends pivotally connected to the rails 15 and 18 at points midway between the ends of the rails, so that when the lazy back is in its normal inoperative position, shown in Figure 3, it may be swung upwardly to operative position from either side, as will readily be understood by reference to Figures 1, 2, and 4. This is a very desirable feature of applicant's invention in that it makes it possible for the occupant of the seat to face in either direction by simply swinging the lazy back into either one of its selected positions, as illustrated in Figures 1 and 2. When the lazy back is folded into flatwise relation with respect to the seat, it may be used as the seat proper without interfering with the movements of the occupants of the boat.

Two complete hinges are preferably used for each lazy back, as shown in Figures 1 and 2, and said hinges, as previously stated, are identical in construction. The hinges are secured to the seat S and lazy back L with the pivots 16 and 19 of each pair of hinges axially alined, and with the pivots 17 and 21 of each pair axially alined. By thus securing the hinges to the seat, the lazy back may readily be reversed from one position to another, as the braces 22 are so connected to the links 15 and 18 that they serve in the same manner, regardless of the position of the lazy back, when in operative position.

It will be noted by reference to the drawings that the lugs 4, 5, 6, and 7 are secured to or formed integrally with the rails 3 and, that in like manner, the lugs 11, 12, 13, and 14 are fixed to the rails 9. It is to be understood that if desired, the rails 3 and 9 may be dispensed with and the lugs secured directly to the seat portion S and lazy back L in properly spaced relation, so that when the links 15 and 18 are pivotally connected thereto, the same results will be obtained. The rails 3 and 9 are desirable in that they make it possible to assemble the hinge as a complete operative unit which facilitates attaching the lazy back to the seat portion S. If the rails were dispensed with, more care would be required in attaching the hinge to the seat S and lazy back L, because it is essential that the axes of the pivots 16 and 19 be substantially alined, as shown in Figure 5, and that the pivots 17 and 21 be similarly axially alined. If desired, the rails 3 of the hinges may be provided at their ends with suitable clamping elements (not shown) for detachably attaching the lazy back to the seat S, whereby it may be readily detached therefrom for storage, or application to another seat. It is also to be understood that in some instances, the braces 22 may be dispensed with by providing suitable stops (not shown) for preventing over swinging of the lazy back.

While I have herein referred to the invention as particularly applicable for use in connection with the lazy backs, it is to be understood that it may be used in connection with various other types of apparatus where applicable.

I claim as my invention:

1. A hinge for reversibly connecting a lazy back to a seat, said hinge comprising means for inseparably connecting the lazy back to the seat, whereby its operative position may be selectively reversed with respect to the seat, and means whereby the lazy back may be folded into flatwise relation with respect to the seat, whereby it may be used as the seat portion, when not in use as a lazy back.

2. A hinge for reversibly connecting a lazy back to a seat, said hinge comprising, means for inseparably connecting the lazy back to the seat whereby it may be selectively positioned at either side of the seat, and whereby the lazy back may be folded into flatwise relation with respect to the seat, in proximity thereto when not in use as a lazy back.

3. A hinge for inseparably connecting a lazy back to a seat, whereby the operative position of the lazy back may be reversed with respect to the seat, said hinge comprising a pair of links each having one end connected to the seat and their opposite ends to the lazy back, and a brace of hinged sections having its ends pivotally connected to said links and adapted to retain both of said links in operative lazy back supporting position.

4. A hinge for pivotally connecting a lazy back to a seat, whereby the operative position of the lazy back may be reversed with respect to the seat, said hinge comprising a pair of links each having one end pivotally connected to the seat and their opposite ends similarly connected to the lazy back, and a brace of hinged sections pivotally connected to said links and adapted to retain both of said links in operative lazy back supporting position.

5. A hinge for pivotally connecting a lazy back to a seat, said hinge comprising a pair of rails, one secured to the seat and the other to the lazy back, a link having one end pivotally connected to one end of the seat rail and its opposite end similarly connected to one end of the lazy back rail, a second link having one end pivotally connected to the opposite end of the seat rail and having its opposite end pivotally connected to the opposite end of the lazy back rail, said links and rails cooperating to provide a pivotal support for the lazy back, whereby it may be selectively swung into operative position at either side of the seat, and an articulated brace pivotally connected to said links and operating to retain the links in lazy back supporting positions.

6. A hinge for pivotally connecting a lazy back to a seat, said hinge comprising a pair of rails, one secured to the seat and the other to the lazy back, a link having one end pivotally connected to one end of the seat rail and its opposite end to the lazy back rail, a second link having one end pivotally connected to the opposite end of the seat rail and having its opposite end pivotally connected to the opposite end of the lazy back rail, said links and rails cooperating to pivotally support the lazy back on the seat, whereby its operative position with respect to the seat may be reversed, and an articulated brace having its terminals pivotally connected to the intermediate portions of said links and operating to retain the links in lazy back supporting positions, the pivotal connections between said rails, links and brace being such as to permit the lazy back to be folded into flatwise relation with respect to the seat, when the lazy back is not in operative position.

7. A hinge for pivotally supporting a member with respect to a fixed support and whereby the swinging movement of the member may be reversed, said hinge comprising brackets secured to the fixed support in spaced relation, and other brackets similarly secured to the pivoted member, a link having one end pivotally connected to one of the brackets of the fixed support and its opposite end pivotally connected to one of the brackets of the pivoted member, a similar link having one end pivotally connected to the other bracket of the fixed support and its opposite end similarly connected to the other bracket of the pivoted member, and the axes of the pivots at the corresponding ends of said links being substantially axially alined whereby the pivoted member may be swung to an angular position at either side of the fixed support.

8. A hinge for pivotally supporting a member with respect to a fixed support and whereby the swinging movement of the pivoted member may be reversed, said hinge comprising brackets secured to the fixed support and other brackets similarly secured to the pivoted member, a link having one end pivotally connected to one of the brackets of the fixed support and its opposite end pivotally connected to one of the brackets of the pivoted member, a similar link having one end pivotally connected to the other bracket of the fixed support and its opposite end to the other bracket of the pivoted member, the axes of the pivots at the corresponding ends of said links being axially alined whereby the pivoted member may be swung to an angular position at either side of the fixed support, and an articulated brace having its terminals connected to the intermediate portions of said links and serving to limit outward swinging movement of the pivoted member in either direction, said brace also permitting the pivoted member to be swung into a plane substantially parallel to the fixed support.

9. A hinge for pivotally connecting a member to a fixed support, whereby the position of the member may be reversed with respect to the support, said hinge comprising means for inseparably connecting the member to the support, whereby the position of the member may be selectively reversed with respect to the support, and means whereby the member may be folded into flatwise relation with respect to the support.

URBAN R. BECK.